United States Patent
Stimson et al.

(10) Patent No.: US 7,939,747 B2
(45) Date of Patent: May 10, 2011

(54) SOLAR HEATING METHOD AND APPARATUS

(76) Inventors: Bradley Owen Stimson, Monte Sereno, CA (US); Marc O'Donnell Schweitzer, San Jose, CA (US)

( * ) Notice: Subject to any disclaimer, the term of this patent is extended or adjusted under 35 U.S.C. 154(b) by 560 days.

(21) Appl. No.: 12/080,705

(22) Filed: Apr. 5, 2008

(65) Prior Publication Data
US 2008/0245403 A1 Oct. 9, 2008

Related U.S. Application Data (60) Provisional application No. 60/922,098, filed on Apr. 6, 2007, provisional application No. 61/065,361, filed on Feb. 11, 2008.

(51) Int. Cl.
*H01L 31/058* (2006.01)
(52) U.S. Cl. .......... 136/248; 136/246; 126/658
(58) Field of Classification Search ........ 136/248; 126/658
See application file for complete search history.

(56) References Cited

U.S. PATENT DOCUMENTS

| | | | |
|---|---|---|---|
| 4,123,003 A | 10/1978 | Winston | |
| 4,204,520 A | 5/1980 | Rosenberg | |
| 4,244,355 A | 1/1981 | Stout | |
| 4,269,172 A | 5/1981 | Parker et al. | |
| 4,273,106 A | 6/1981 | Gould | |
| 4,454,863 A | 6/1984 | Brown et al. | |
| 4,517,961 A | 5/1985 | Bloor et al. | |
| 4,587,376 A * | 5/1986 | Kosaka et al. | 136/248 |
| 4,607,132 A | 8/1986 | Jarnagin | |
| 5,460,164 A | 10/1995 | Rekstad et al. | |
| 6,182,404 B1 | 2/2001 | Rinklake et al. | |
| 6,407,328 B2 | 6/2002 | Kleinwachter | |
| 6,750,392 B1 | 6/2004 | Yen et al. | |
| 7,077,124 B2 | 7/2006 | Szymocha | |
| 2005/0133082 A1 | 6/2005 | Konold et al. | |
| 2005/0241633 A1 | 11/2005 | Nikiforov et al. | |
| 2005/0263181 A1 | 12/2005 | Yen | |

FOREIGN PATENT DOCUMENTS
JP 11354819 A * 12/1999

OTHER PUBLICATIONS
"What is Silicone?" www.wisegeek.com Retrieved Feb. 25, 2011.*

* cited by examiner

*Primary Examiner* — Jennifer K. Michener
*Assistant Examiner* — Magali P Slawski
(74) *Attorney, Agent, or Firm* — Brian R. Short (57) ABSTRACT

Embodiments for methods and apparatuses for solar heating are disclosed. One solar heating apparatus includes an insulating layer adjacent to an exterior of a structure. A heat transfer plate is adjacent to the insulating layer. A fluid conduit is adjacent to the heat transfer plate. The heat transfer plate is thermally connected to the fluid conduit for transferring heat from the heat transfer plate to fluid within the fluid conduit. A weather exposed layer is thermally connected to the heat transfer plate.

9 Claims, 14 Drawing Sheets

SOLAR HEATING METHOD AND APPARATUS

RELATED APPLICATIONS

This patent application claims priority to provisional patent application 60/922,098 filed on Apr. 6, 2007, and provisional patent application 61/065,361 filed Feb. 11, 2008, which are herein incorporated by reference.

FIELD OF THE DESCRIBED EMBODIMENTS

The described embodiments relate generally to solar energy. More particularly, the described embodiments relate to a method and apparatus for solar heating.

BACKGROUND

Solar energy is a viable source of alternative energy. One form of solar energy includes thermal heating of water with solar water heating panels. However, present methods for solar water heating include unattractive panels that are unreliable and have limited useful lifetimes.

It is desirable to have an apparatus and method of solar heating that is attractive, reliable and has a long useable life time.

SUMMARY

An embodiment includes a solar heating apparatus. The solar heating apparatus includes an insulating layer adjacent to an exterior of a structure. A heat transfer plate is adjacent to the insulating layer. A fluid conduit is adjacent to the heat transfer plate. The heat transfer plate is thermally connected to the fluid conduit for transferring heat from the heat transfer plate to fluid within the fluid conduit. A weather exposed layer is connected thermally to the heat transfer plate.

Another embodiment includes a method of configuring a solar heating apparatus. The method includes laying a solar heating apparatus over a building structure, wherein the solar heating apparatus comprising a heat transfer plate, a fluid conduit in thermal contact with the heat transfer plate, the fluid conduit able to transfer heat from the heat transfer plate to fluid within the fluid conduit, an insulating layer adjacent to the fluid conduit, which can be placed adjacent to a building structure. The method further comprises placing a weather exposed material over the solar heating apparatus; and attaching the weather exposed material by penetrating the weather exposed material and the solar heating apparatus.

Another embodiment includes a method of heating fluid. The method includes pumping the fluid through a fluid conduit, exposing an exterior layer of a building structure to a radiant heat source, conducting heat from the exterior layer to the fluid within the fluid conduit through a heat transfer plate, and insulating the fluid conduit and heat transfer plate.

Another embodiment includes a laminated solar heating panel. The laminated solar heating panel includes a heat transfer plate, wherein the heat transfer plate is attachable under a weather exposed layer. A fluid conduit is in thermal contact with the heat transfer plate, wherein the fluid conduit is able to transfer heat from the heat transfer plate to fluid within the fluid conduit. An insulating layer is adjacent to the fluid conduit, and is mountable adjacent to a building structure.

Another embodiment includes a laminated solar heating apparatus. The laminated solar heating apparatus includes a heat transfer plate. A malleable heat transfer layer is adjacent to the heat transfer plate. A fluid conduit is in thermal contact with the heat transfer plate, wherein the fluid conduit is able to transfer heat from the heat transfer plate to fluid within the fluid conduit. An insulating layer is adjacent to the fluid conduit and heat transfer plate.

Other aspects and advantages of the described embodiments will become apparent from the following detailed description, taken in conjunction with the accompanying drawings, illustrating by way of example the principles of the described embodiments.

DETAILED DESCRIPTION

The described embodiments provide solar heating that can reside beneath standard roofing material. As a result, the solar heating methods, and the solar heating apparatuses can be hidden from view, and do not include visably unattractive solar panels. Additionally, if located below roofing material, the methods and apparatus are protected from the elements (for example, sun, cold, rain and wind), and therefore, are reliable and typically last for long periods of time.

Embodiments of the solar water heating panels can be installed under the standard roofing (or siding) material. The solar water heating panels when compared to commercially available glazed or unglazed panels are lower in cost, lighter weight, more aesthetically pleasing (completely hidden from view) and longer lasting. Homeowners and architects can incorporate the "hidden panels" without disturbing the architectural integrity or aesthetics of a home or building design, leading to greater acceptance of the solar panels in the marketplace. The solar heating panels can be used to heat water for use in domestic hot water systems, pools and radiant heating systems. Furthermore, the panels can be used to keep a roof or exterior surface cooler. Therefore, energy usage for air conditioning is reduced and the lifetime of roofing materials is increased. An embodiment of the solar heating panels is paired with photovoltaic panels or tiles. This pairing leads to more efficient and longer lifetime photovoltaic panels, while producing hot water for pool or domestic use.

Figure 1:
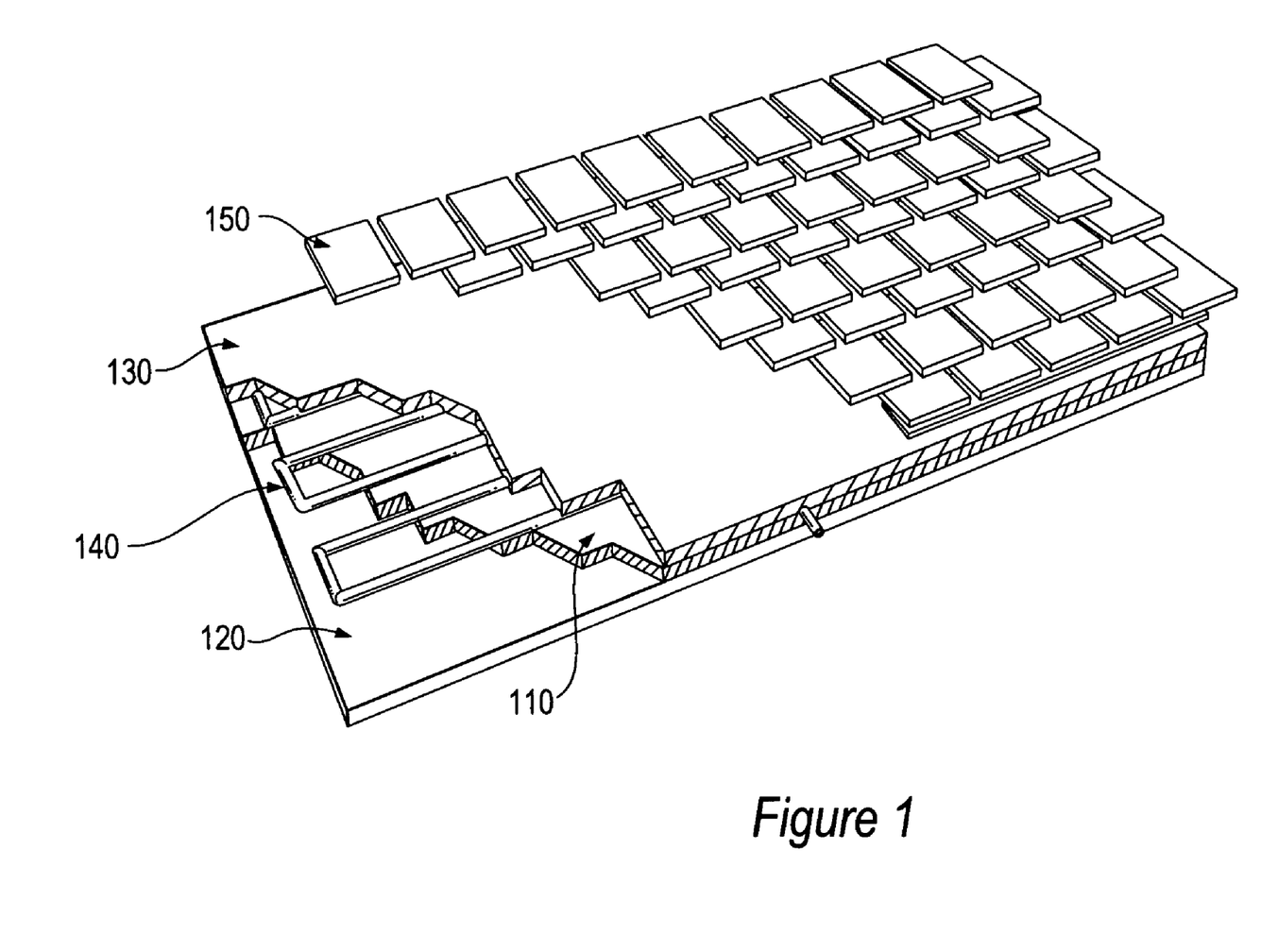
FIG. 1 shows an example of a solar heating apparatus.

FIG. 1 shows an example of a solar heating apparatus. The solar heating apparatus includes an insulating layer 110 adjacent to an exterior of a structure 120 (such as, the side or roof sheathing), a heat transfer plate 130 adjacent to the insulating layer 110, and a fluid conduit 140 adjacent to the heat transfer plate 130. The heat transfer plate 130 is thermally connected to the fluid conduit 140 for transferring heat from the heat transfer plate 130 to fluid within the fluid conduit 140. A weather-exposed layer 150 is thermally connected to the heat transfer plate 130.

Insulating Layer

The insulating layer 110 provides a thermal barrier between the adjacent building structure 120 and adjacent fluid conduit 140 and heat transfer plate 130. The insulating layer 110 typically includes any material with good insulating properties such as air, foam, wood, fiber glass, stucco, etc. The Insulating layer 110 provides two functions. More specifically, the insulating layer 110 minimizes undesirable heat transfer to the building structure and the subsequent conditioned interior space during warming periods and maximizes capture of the radiant energy by the heat transfer plate. The Insulating Layer is comprised of any material that has good thermal insulating properties, such as, wood, foam insulation, polystyrene, air, rubber, plastics, and ceramics.

Heat Transfer Plate

The heat transfer plate 130 collects heat from the adjacent weather exposed layer 150 or directly from the radiant heat source and conducts this heat to the fluid conduit 140. The heat transfer plate 130 includes a material which possesses good thermal conducting properties, such as, thermal plastic, aluminum, copper, brass, tin, steel, or alloys of these.

Fluid Conduit

The fluid conduit 140 conducts heat from the adjacent heat transfer plate 130 to the fluid 510 flowing within the fluid conduit 140. The fluid conduit 140 includes a material which possesses good thermal conducting properties, such as, copper, brass, aluminum, PEX (cross linked polyethelene), steel, thermal conducting plastics, and stainless steel.

Fluid

The fluid (shown in FIG. 5 as element 510) within the fluid conduit 140 is thermally heated, and includes any fluid, vapor, gas, liquid that provides good heat capacity in order to maximize heat transfer from the heat transfer plate 130 to a destination use such domestic hot water system, swimming pool heating system, space heating system, etc. Typical materials utilized as the fluid include water, water mixed with glycol, water mixed with antifreeze solution, other liquids, air or other gases.

Weather-exposed Layer

The weather-exposed layer 150 is comprised of materials typically used in construction, and is designed specifically for prolonged exposure to the weather and the elements. Examples of materials typically used for the weather exposed layer 150 include composite shingles or shakes, metal roofing, tile roofing, concrete roofing, clapboard siding, stucco, wood panel siding, etc. In an embodiment, the device is left uncovered so as to serve itself as the weather exposed layer of the building structure. The Weather-exposed layer 150 can be affixed to the building structure by using fasteners (typically nails or screws) that penetrate the solar heating panel apparatus and anchor to the building sheathing. For an embodiment, the solar heating panel apparatus is visually marked indicating where to safely penetrate with fasteners into the building structure without compromising (damaging) the fluid conduit 140.

As described, embodiments include the heat transfer plate 130 being placed between the weather exposed layer 150 and the fluid conduit 140. This is not an expected configuration for one familiar with the art as it places an additional barrier between the weather exposed layer 150 and the fluid conduit 140. However, the heat transfer plate 130 can provide several additional advantages. The heat transfer plate 130 can adapt the geometry of the underside of the weather exposed layer 150 to the shape of the fluid conduit 140 so as to maximize the surface area in contact with the weather exposed layer 150, and provides for conduction of accumulated heat energy to the fluid conduit 140. The heat transfer plate 130 stiffens the solar heating apparatus so as to better resist shipping, handling and foot traffic without damage during assembly on, for example, a building structure. The heat transfer plate 130 can be configured to clamp the fluid conduit 140 firmly to the insulating layer 110, thereby providing better mechanical stability of the solar heating apparatus.

The insulating layer 110 of the described embodiment provides several advantages. The insulating layer 110 provides a stable rigid surface to walk on during assembly of the solar heating apparatus on a building structure. The insulating layer 110 provides rigidity of the solar heating apparatus during handling. The insulating layer 110 provides accommodation of the contours of the heat transfer plate 130 and fluid conduit 140 resulting in a flat or contoured surface, thereby facilitating attachment of the weather exposed layer 150 and facilitating stacking of the solar heating apparatus during shipping and handling and during assembly on the building structure. The insulating layer 110 reduces parasitic heat loss to the building structure, thereby maximizing the heat collected by the heat transfer plate 130 and the fluid conduit 140. Additionally, the insulating layer 110 reduces the radiant heat load on the building structure, thereby reducing the interior cooling requirement.

Figure 2:
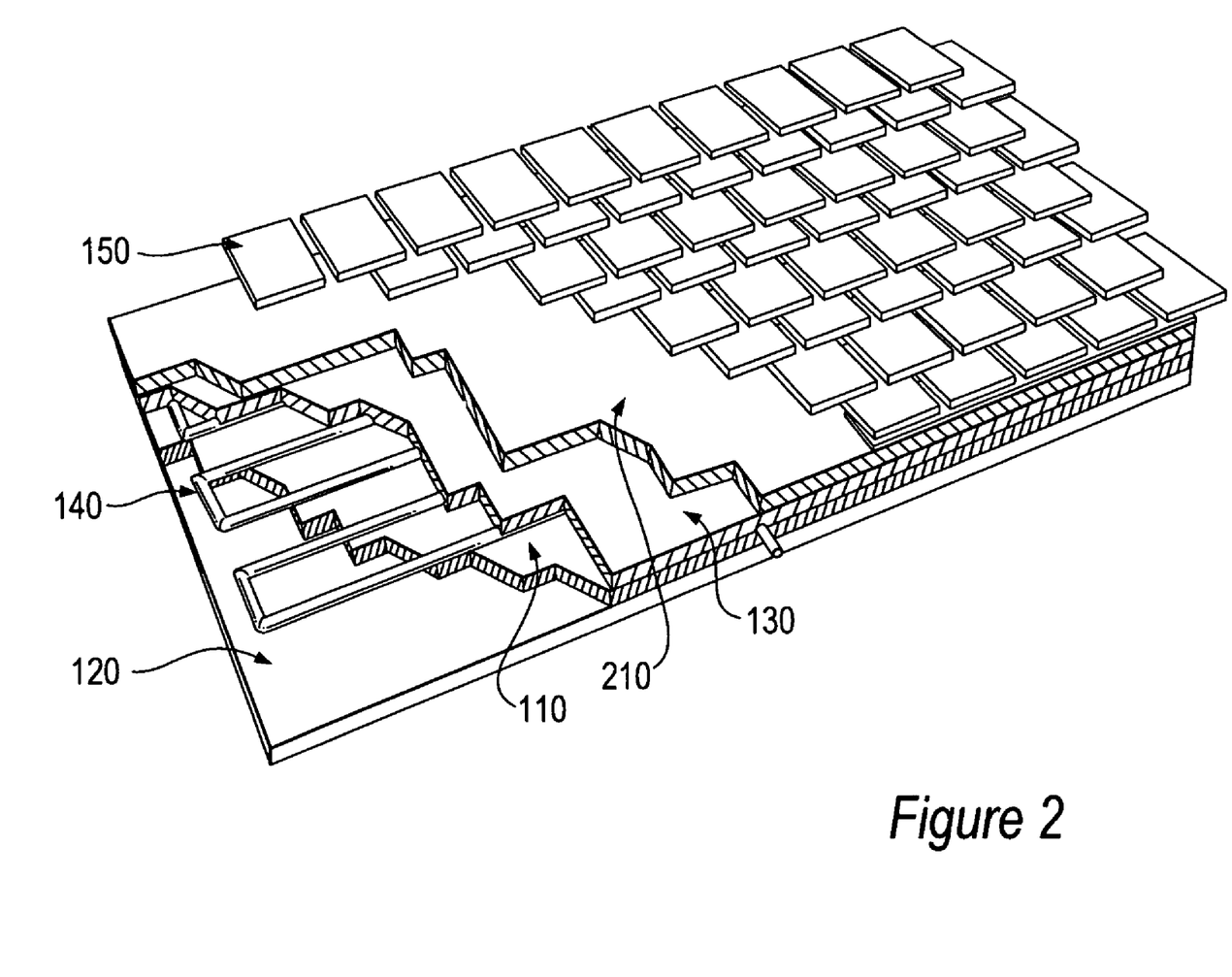
FIG. 2 shows an example of a solar heating apparatus that additionally includes a malleable heat transfer layer in-between the weather exposed layer and the heat transfer plate of the solar heating apparatus of FIG. 1.

FIG. 2 shows an example of a solar heating apparatus that additionally includes a malleable heat transfer layer 210 in-between the weather exposed layer 150 and the heat transfer plate 130 of the solar heating apparatus of FIG. 1.

Malleable Heat Transfer Layer

An embodiment includes the malleable heat transfer layer 210 in-between the weather exposed layer 150 and the heat transfer plate 140 for improving thermal transfer from the weather exposed layer 150. Of the three forms of heat transfer (conduction, radiation and convection), conduction heat transfer is the most desirable and efficient. The malleable heat transfer layer 210 maximizes conduction heat transfer by filling gaps and irregularities between the heat transfer plate 140 and weather-exposed layer 150. Therefore, a better thermal contact between the weather-exposed layer 150 and the heat transfer plate 130 can be realized. The malleable heat transfer layer 210 comprises a good thermal conductor, such as, tar mixed with aluminum powder, tar mixed with copper powder, sandwiched layers of tar and aluminum or copper foil, or any material with good gap filling and thermally conductive properties.

The described embodiments can benefit from the use of the malleable heat transfer layer 210. For example, the malleable heat transfer layer 210 maximizes the area in thermal contact between the heat transfer plate 130 and the weather exposed layer 150 by accommodating for the undulations and defects in the mating surfaces. The malleable heat transfer layer 210 increases the thermal conductivity above what could be achieved with an air gap alone. In some embodiments, the malleable heat transfer layer 210 physically bonds the weather exposed layer 150 to the heat transfer plate 130 to improve reliability of the weather exposed layer 150 to weather damage.

The solar heating apparatuses of FIG. 1 and FIG. 2 provide a means for heating a fluid (for example, water) from a radiant heat source (such as, the sun), that can be placed beneath the weather exposed layer (such as, a roof) of a building structure, resulting in the solar heating apparatus being non-visible, and thereby, providing a more pleasing aesthetic appearance than existing solar heating panel technology. Another advantage of the solar heating apparatus is that the solar heating apparatus can be used with a variety of weather exposed layer materials and styles, thereby providing, for example, an architect, greater design flexibility than possible with existing solar technology. The solar heating apparatus can be installed on any building surface exposed to the sun so as to collect the sun's solar radiation to heat water as part of a solar water heating system. Alternatively, the solar heating apparatus can be attached to the building structure with the heat transfer plate serving also as the weather-exposed layer.

Figure 3:
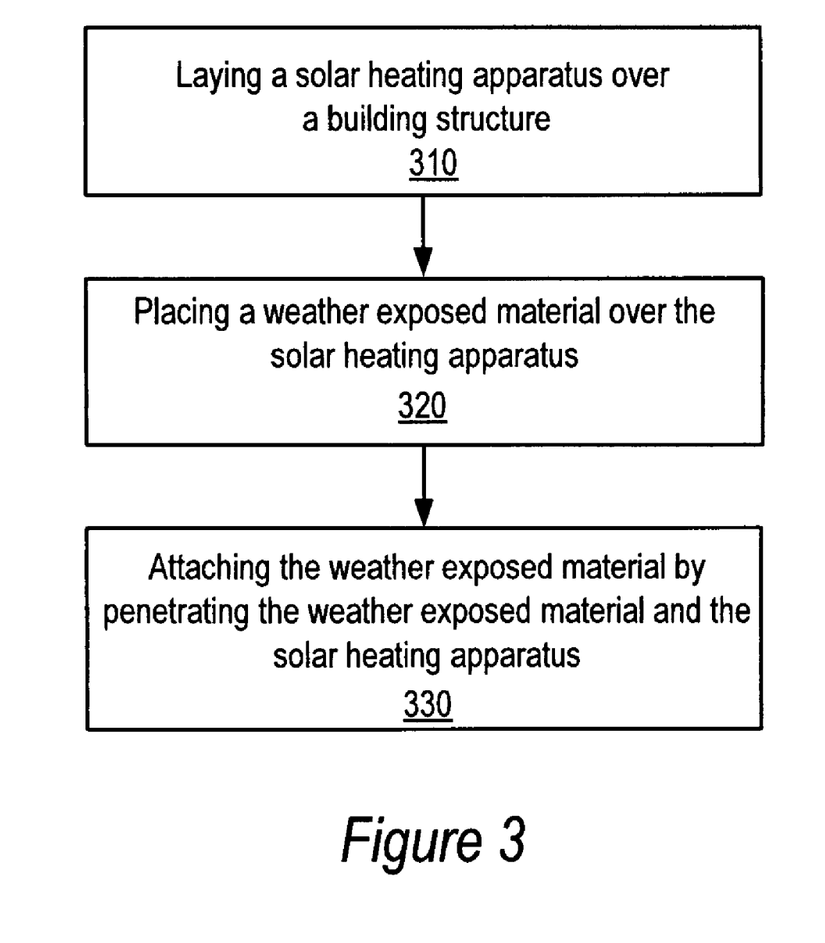
FIG. 3 is a flow chart that shows steps of an example of a method of configuring the solar heating apparatus.

FIG. 3 shows an example of a method of configuring the solar heating apparatus. A first step 310 includes placing the solar heating apparatus onto the exterior of the building structure. The solar heating apparatus includes a heat transfer plate, a fluid conduit in thermal contact with the heat transfer plate, the fluid conduit able to transfer heat from the heat transfer plate to the fluid within the fluid conduit, an insulating layer adjacent to the fluid conduit which can be placed adjacent to the building structure. A second step 320 includes applying the weather-exposed layer over the solar heating apparatus. A third step 330 includes attaching the weather-exposed layer by penetrating the weather-exposed layer and the solar heating panel with fasteners, typically nails or screws.

Figure 4:
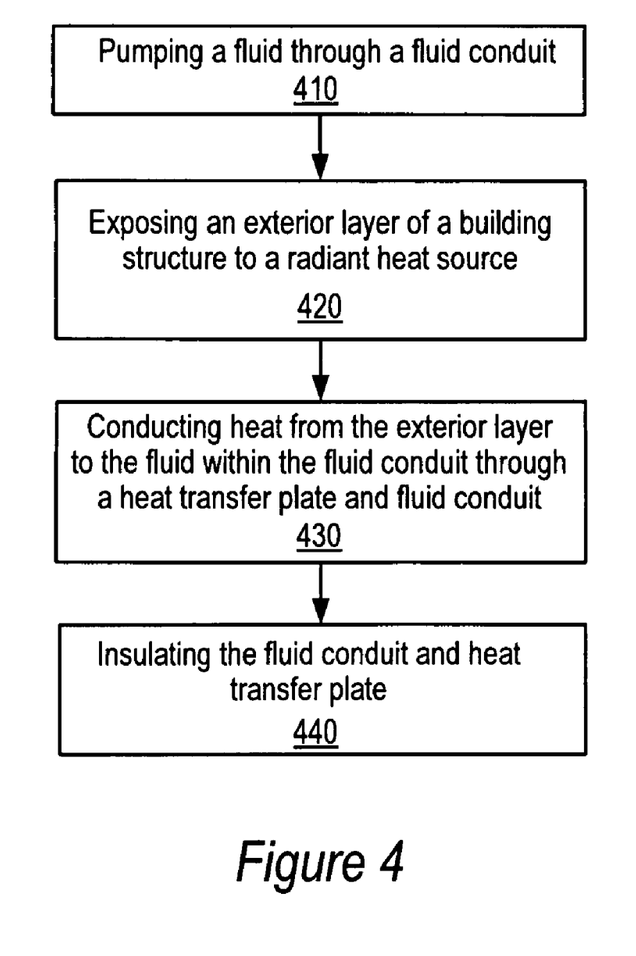
FIG. 4 is a flow chart that shows one example of steps of a method of heating fluid.

FIG. 4 is a flow chart that shows one example of steps of a method of heating fluid. A first step 410 includes pumping a fluid through a fluid conduit. A second step 420 includes exposing an exterior layer of a building structure to a radiant heat source. A third step 430 includes conducting heat from the exterior layer to the fluid within the fluid conduit through a heat transfer plate and the fluid conduit. A fourth step 440 includes insulating the fluid conduit and heat transfer plate. The insulating layer prevents loss of the heat energy into the building structure. The heat energy stored within the fluid by the solar heating apparatus can be used in a variety of ways to those familiar with the art of solar system design such as to heat potable water, pool water, interior spaces, thermal mass storage, etc.

Figure 5:
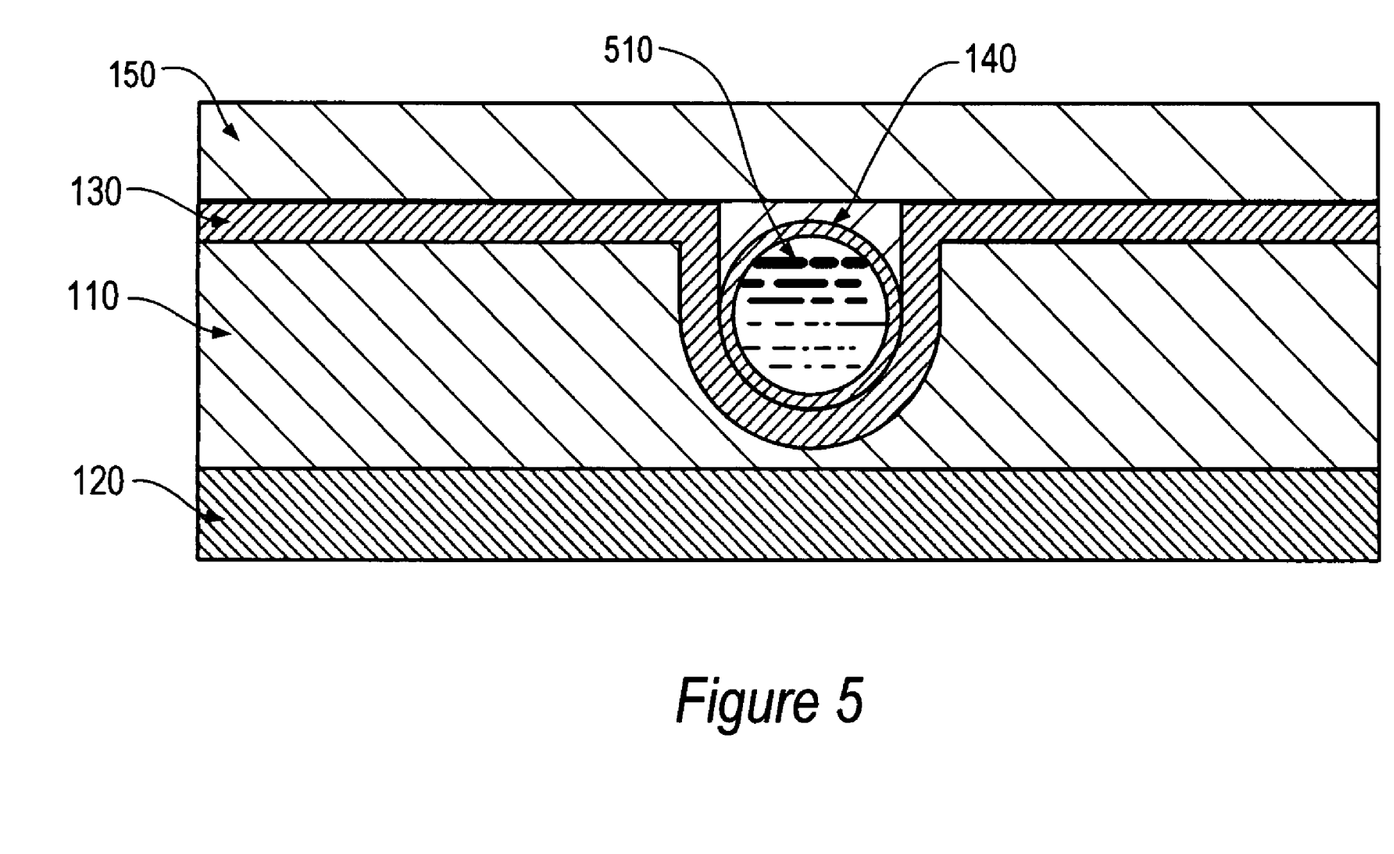
FIG. 5 shows a cross-sectional view of an example of a laminated solar heating panel.

FIG. 5 shows an example of a laminated solar heating panel. The laminated solar heating panel includes a heat transfer plate 130, wherein the heat transfer plate 130 is attachable under a weather exposed layer 150. A fluid conduit 140 is in thermal contact with the heat transfer plate 130, and the fluid conduit 140 transfers heat from the heat transfer plate 130 to fluid 510 within the fluid conduit 140. An insulating layer 110 is adjacent to the fluid conduit 140, and the insulating layer 110 is mountable adjacent to a building structure 120.

Figure 6:
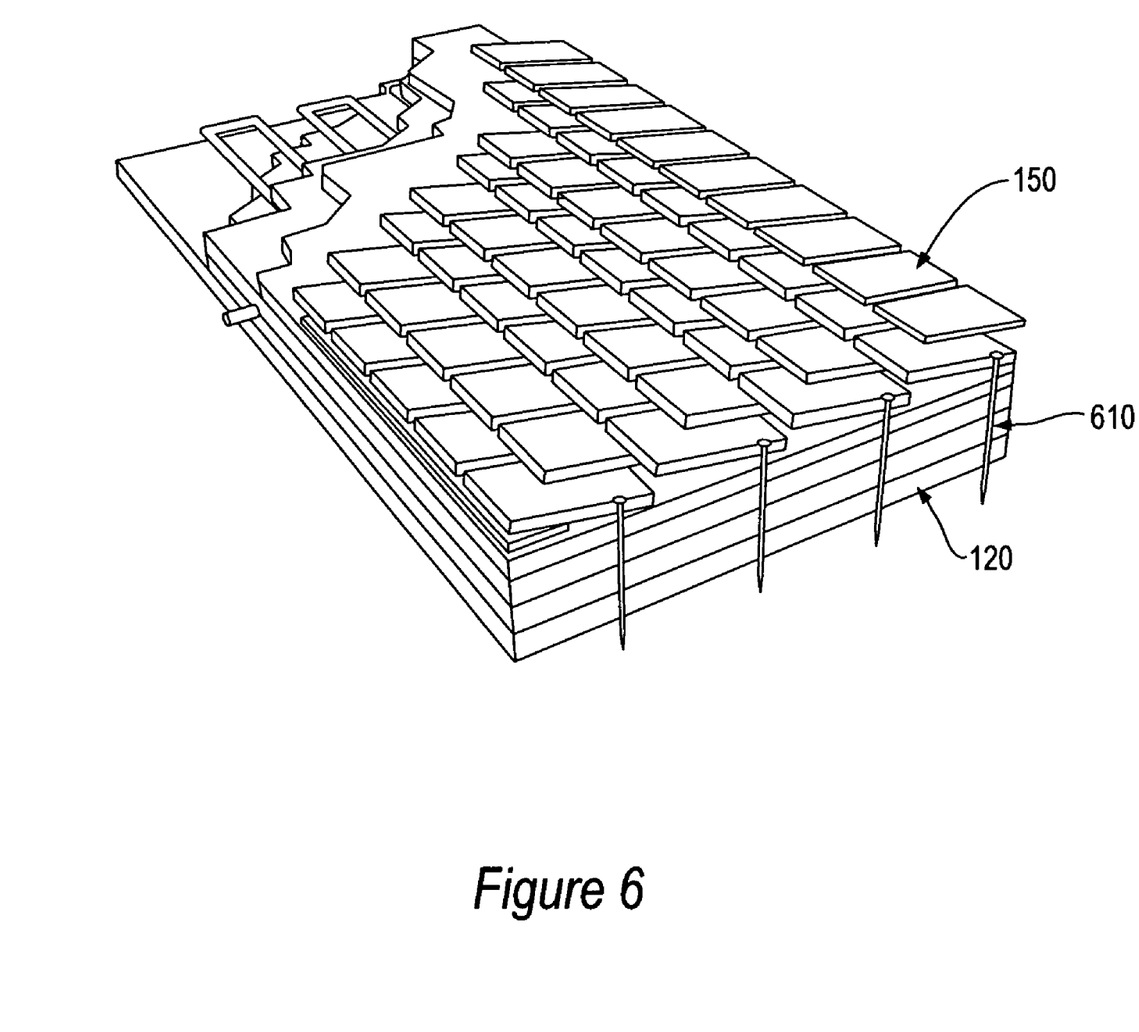
FIG. 6 shows an example of the solar heating panel of FIG. 5 attached to a building structure.

FIG. 6 shows an example of the solar heating panel of FIG. 5 attached to a building structure. An embodiment includes the solar heating apparatus being attached to the building structure 120 by penetrating the solar heating apparatus with fasteners 610. The fasteners 610 can be, for example, nails, staples or screws. An alternate embodiment includes the weather exposed building exterior 150 being attached to the solar heating apparatus by penetrating the weather exposed layer 150 and the solar heating panel with fasteners 610.

Figure 7:
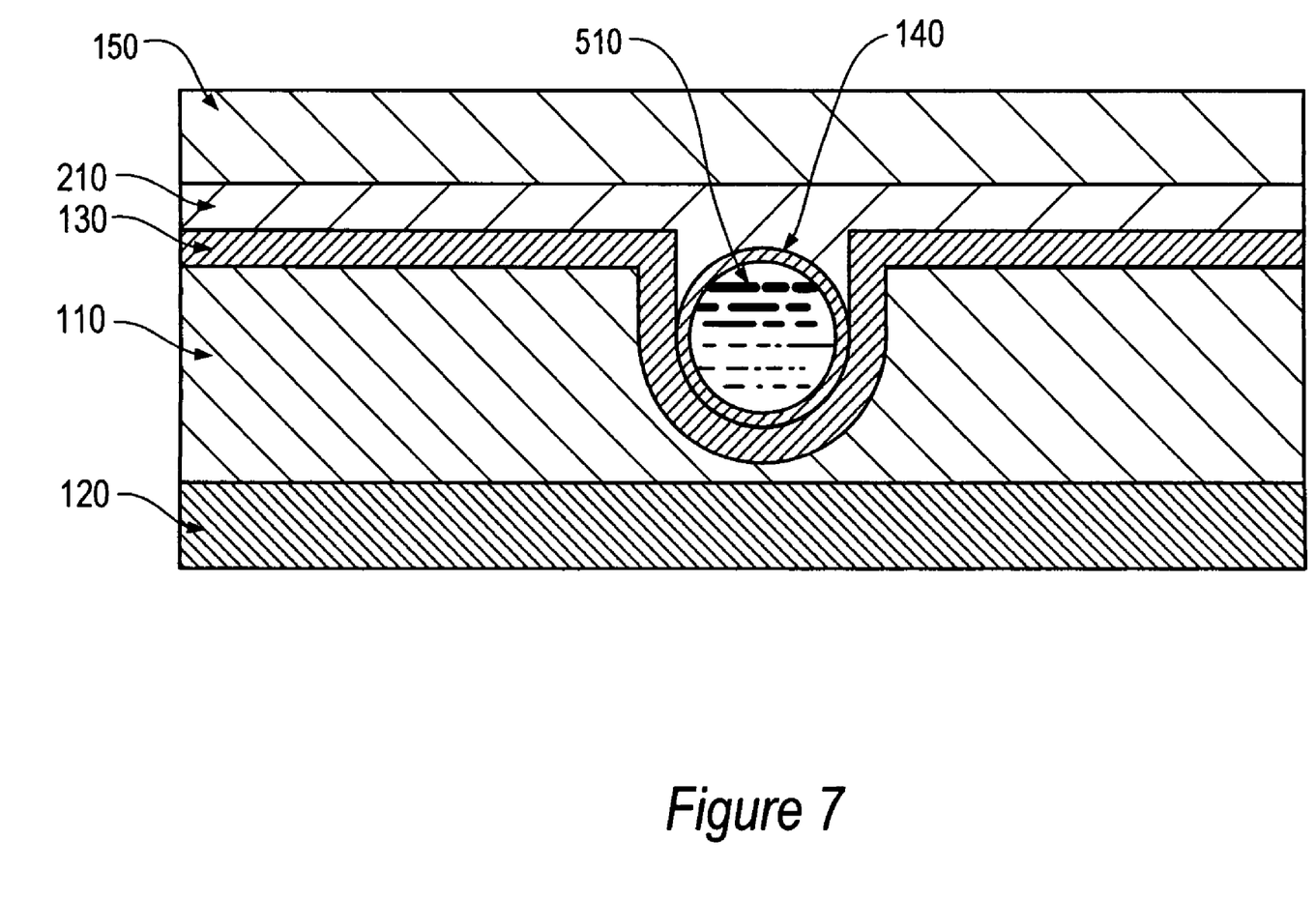
FIG. 7 shows an example of the solar heating panel of FIG. 5 attached to a building structure, wherein the solar heating panel further includes a malleable heat transfer layer.

FIG. 7 shows an example of the solar heating panel of FIG. 5 attached to a building structure, further including a malleable heat transfer layer 210. As shown, this embodiment includes the malleable heat transfer layer 210 being adjacent to the heat transfer plate 130. The malleable heat transfer layer 210 fills gaps between the roofing or siding layer 150 and the heat transfer plate 130.

Embodiments of the malleable heat transfer layer 210 include a malleable material with high thermal conductivity. The malleable material transfers heat from the exposed building exterior layer 150 to the heat transfer plate 130.

For an embodiment, the heat transfer plate 130 includes a highly thermal conductive material that is in thermal contact with the fluid conduit 140. An embodiment of the fluid conduit 140 includes a thermally conductive material.

Figure 8:
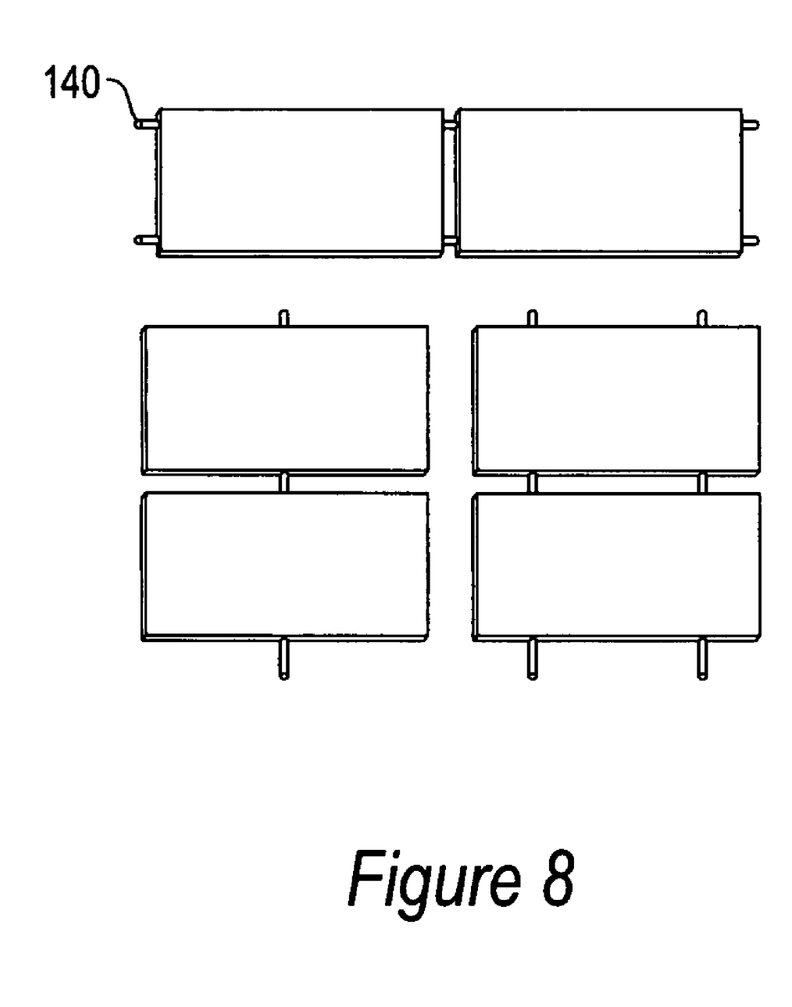
FIG. 8 shows an example of solar heating panels that include fluid conduits that are configured to mate with fluid conduits of adjacent solar heating panels.

FIG. 8 shows an example of a solar heating panel that includes a fluid conduit that is configured to mate with a fluid conduit of an adjacent solar heating panel. That is, the fluid conduit 140 is configured to mate with another fluid conduit 140 of an adjacent solar heating panel when the solar heating panels are attached to a building structure.

For an embodiment, each fluid conduit includes an inlet and an outlet, wherein the inlet and outlet are located so that multiple panels can be connected in series and or parallel. For an embodiment, the inlets and outlets are located so that multiple panels can be connected in vertical and or horizontal orientations. That is, the solar heating panel apparatus is designed to mate with other solar heating panels in a variety of configurations. More specifically, the solar heating apparatus has configurable inlet and outlet ports located in a way that facilitates connections with adjacent units in vertical and horizontal orientations. Furthermore, a plurality of the solar heating panels can be arranged on a building structure connected in series, parallel or a combination thereof. The easy of mating of the panels provides for ease of instillation.

Figure 9:
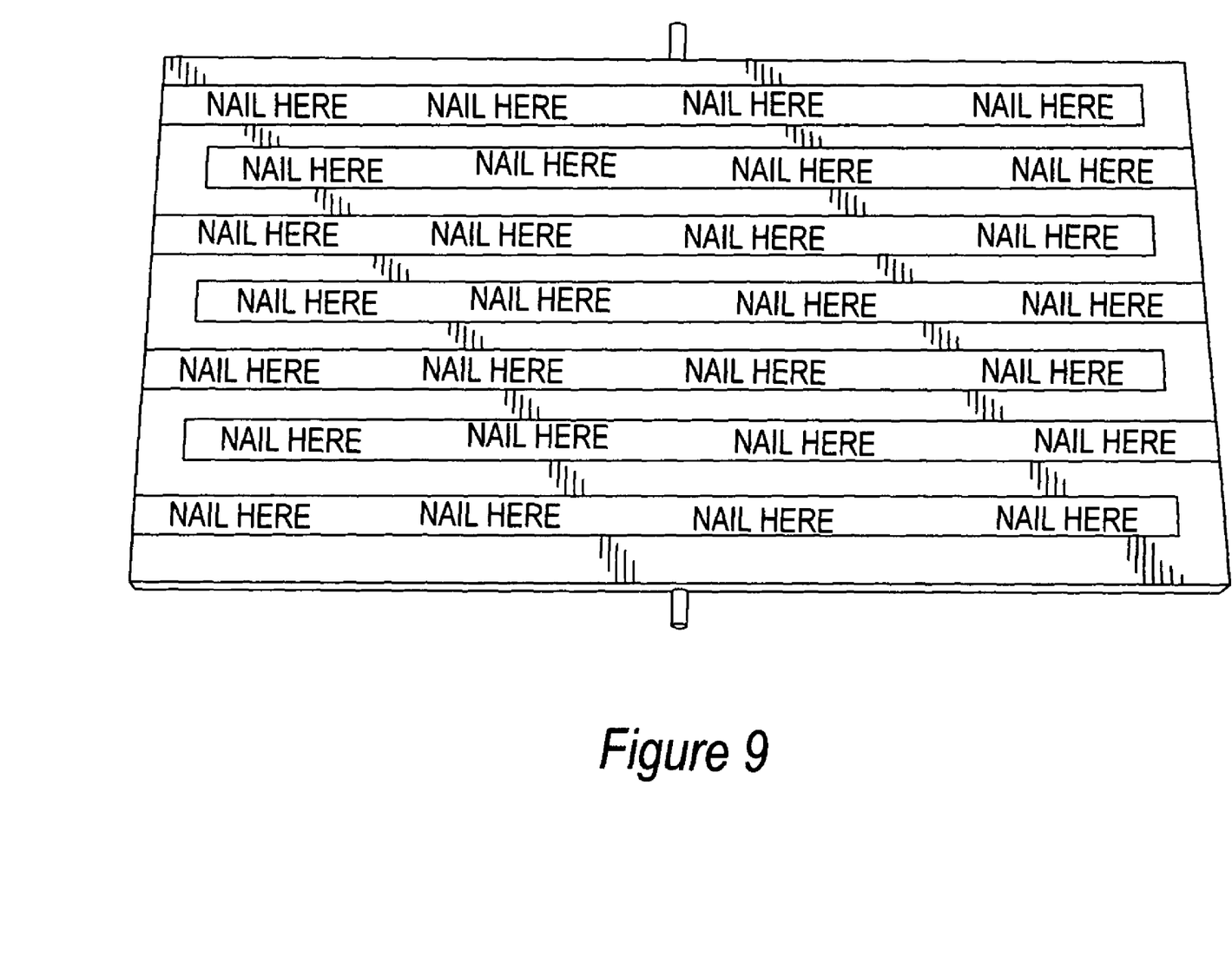
FIG. 9 shows an example of a solar heating apparatus that is visually marked where not to penetrate the solar heating apparatus.

FIG. 9 shows an example of a solar heating apparatus that is visually marked where not to penetrate the solar heating apparatus. More specifically, an exterior of the solar heating apparatus is visually marked indicating where not to penetrate the roofing apparatus. The benefit this provides is that the solar heating apparatus can be attached to an exterior of a building without damaging the solar heating apparatus.

An embodiment includes the heat transfer plate being utilized as the weather exposed layer 150.

Additional Description of Embodiments

The solar heating apparatus can be fabricated by a variety of methods including soldering annealed copper tubing to a copper sheet that acts as the heat transfer plate followed by bonding the copper assembly using mastic or glue to a sheet of rigid foam insulation that incorporates a cavity to accept the copper tubing thereby allowing the copper sheet to sit flush with the foam panel. The malleable heat transfer layer can be applied directly on the panel or applied to the back of the weather-exposed layer. The designated fastening areas can be marked directly on the apparatus typically using paint, ink or decals. Another fabrication method includes using aluminum heat transfer plates and PEX (thermal conductive plastic) tubing, both of which are readily available from the radiant floor heating industry. Similarly, the aluminum heat transfer plates and PEX tubing can be glued to the foam insulation panel. The malleable heat transfer layer can be applied directly on the panel or applied to the back of the weather exposed layer. Again, the designated areas for penetration can be marked, for example, by paint, ink or decals.

An advantage provided by the described embodiment includes an ease of formation of the solar heating apparatus of solar heating panels. An example of a method of forming the apparatus or panels includes first determining spacing of the fluid conduit and the heat transfer plate in the panel based on desired shingle/tile spacing (spacing not constrained for steel roof). Channels in an insulator panel component are created equal to required spacing of the fluid conduit and the heat transfer plates. The heat transfer plates are bonded to the fluid conduit forming a subassembly. The fluid conduit and the heat transfer plate subassembly are bent to match channels made in the insulator panel component. The fluid conduit and the heat transfer plate subassembly are bonded to the insulator panel component. The malleable heat transfer layer is applied to the exposed surface of heat transfer plate.

For one embodiment, the insulator panel component includes a 1 inch thick rigid polyisocyanate foam. Each heat transfer plate includes an aluminum extrusion that is approximately 4 inches wide and 7.5 feet long and approximately 0.030" thick with a channel formed in the center of the long axis that is shaped to accept the fluid conduit. Depending on the required spacing of the shingles or tiles, typically 7 parallel and equally spaced rows of heat transfer plates are required per 4×8 ft solar heating panel. The fluid conduit can be ½" nominal annealed copper tubing through which the fluid flows. The fluid may be water or a water/glycol mixture. The fluid conduit can be bonded to the heat transfer plate using thermally conductive adhesive and/or snapped into place with a capture feature formed into the heat transfer plate so as to form intimate thermal contact. The malleable heat transfer layer may be a thermally conductive substance that is applied to the exposed surface of the heat transfer plates and is applied to improve the thermal contact between the weather exposed layer and the heat transfer plate.

Another embodiment of the invention includes physically placing the fluid conduit within the solar panel in such a manner as to be placed between the fasteners used to attach the weather exposed layer and substantially centered on individual pieces of the weather exposed layer to optimize thermal transfer.

Another embodiment of the invention replaces the annealed copper tubing in the described embodiments above with ½" diameter cross-linked Polyethylene (PEX) tubing. Other tubing sizes and materials can also suffice.

Another embodiment includes replacing the polyisocyanate foam used in the insulator component with polystyrene foam. However, any semi-rigid material with good insulative properties is sufficient.

Pairing Solar Panels (or Apparatus) with Photovoltaic Devices

Figure 10:
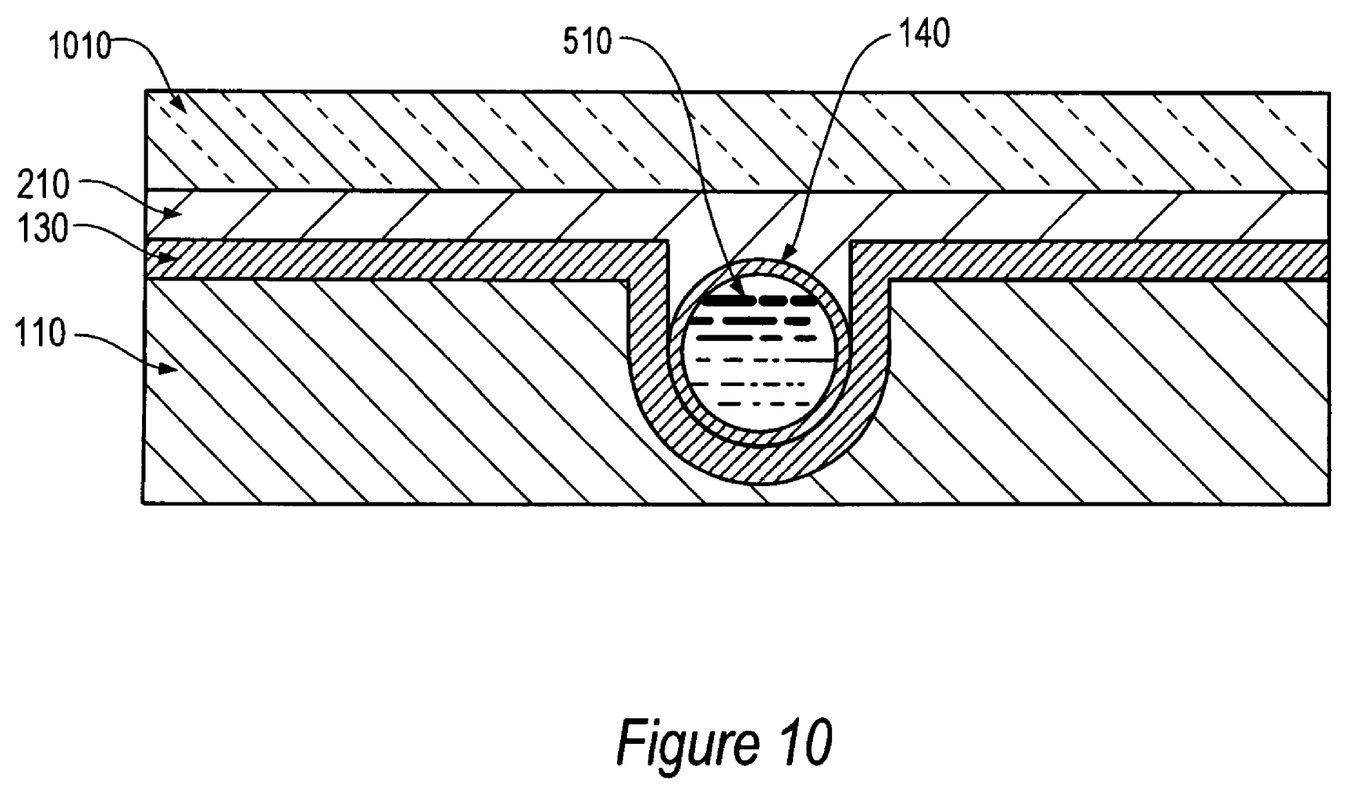
FIG. 10 shows a cross-sectional view of an example of a laminated solar heating panel with photovoltaic device.

FIG. 10 shows a cross-sectional view of an example of a laminated solar heating panel with photovoltaic device. The laminated solar heating panel includes a weather exposed photovoltaic device 1010 being adjacent to the malleable heat transfer layer 210, the heat transfer plate 130 being adjacent to the malleable heat transfer layer, the fluid conduit 140 being adjacent to the heat transfer plate 130. The fluid conduit 140 is in thermal contact with the heat transfer plate 130, and the fluid conduit 140 transfers heat from the heat transfer plate 130 to fluid 510 within the fluid conduit 140. An insulating layer 110 is adjacent to the fluid conduit 140.

In conjunction with the solar heating panel and photovoltaic device of FIG. 10, an embodiment of a method of configuring the solar heating apparatus includes attaching the solar heating apparatus (or panel) to the backside of a weather exposed photovoltaic device 1010. As previously described, the solar heating apparatus includes a heat transfer plate 130, a fluid conduit 140 in thermal contact with the heat transfer plate 130, the fluid conduit 140 able to transfer heat from the heat transfer plate 130 to fluid 510 within the fluid conduit 140, an insulating layer 110 adjacent to the fluid conduit 140. Additionally, another embodiment includes the heat transfer plate 130 electrically conducting power from the weather exposed photovoltaic device 1010.

Figure 11:
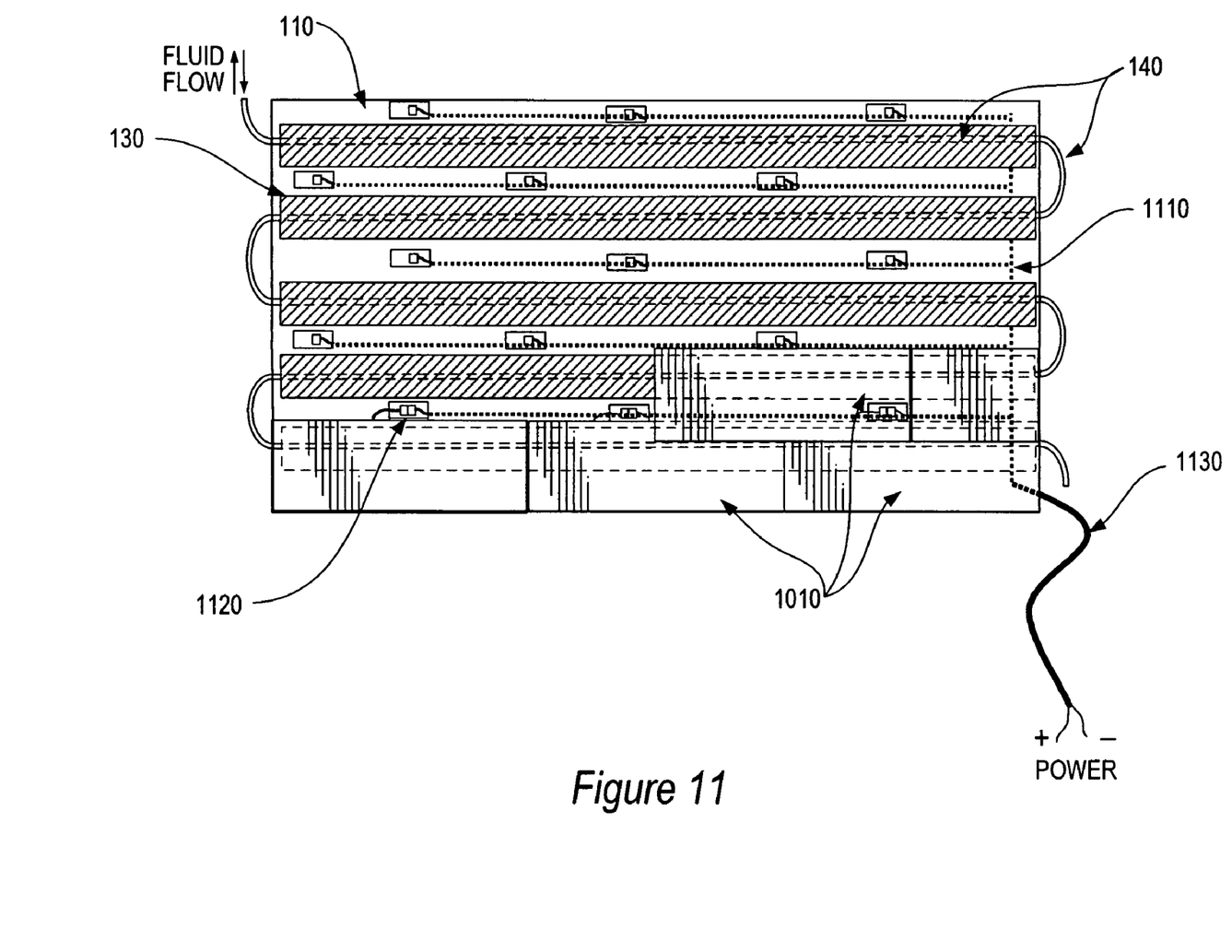
FIG. 11 shows another embodiment of a solar heating apparatus with photovoltaic devices in the form of shingles or tiles attached adjacent to the heat transfer plate, and an electrical power cable that provides electrical connections between the photovoltaic devices.

FIG. 11 shows another embodiment of a solar heating apparatus with photovoltaic devices in the form of shingles or tiles 1010 attached adjacent to the heat transfer plate 130, a fluid conduit 140 adjacent to the insulating layer 110. The photovoltaic shingles or tiles 1010 are electrically connected to a wiring infrastructure 1110 using electrical connectors 1120. The wiring infrastructure 1110 terminates in a single electrical power cable 1130 that facilitates electrical connection between the photovoltaic devices.

Figure 12:
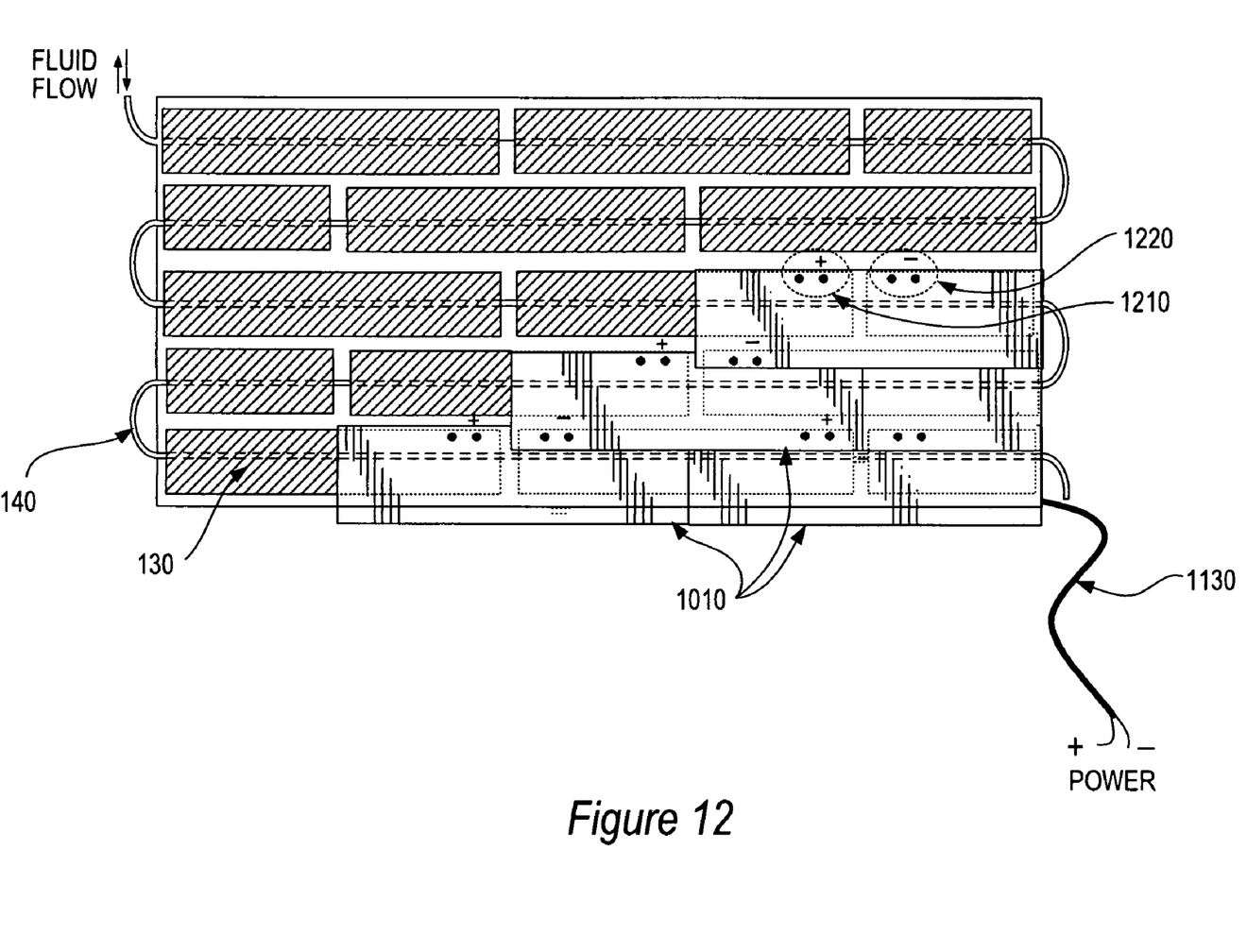
FIG. 12 shows another embodiment of a solar heating apparatus with a plurality of photovoltaic devices in the form of shingles or tiles attached adjacent to the heat transfer plate, wherein the heat transfer plate provides electrical connections between the photovoltaic devices.

FIG. 12 shows another embodiment of a solar heating apparatus with a plurality of photovoltaic devices in the form of shingles or tiles 1010 attached adjacent to the heat transfer plate 130, a fluid conduit 140 adjacent to the insulating layer 110. In this embodiment the heat transfer plates 130 are segmented into pieces and used as electrical conductors. The photovoltaic devices 1010 utilize the heat transfer plate 130 segments as electrical conductors to transport electrical power to the single output cable 1130. The heat transfer plate 130 segments also can act as contact points to make both positive 1210 and negative 1220 electrical contact to a plurality of photovoltaic devices. The contact points can be weather tight, improving reliability and lifetime of the electrical contacts.

Figure 13:
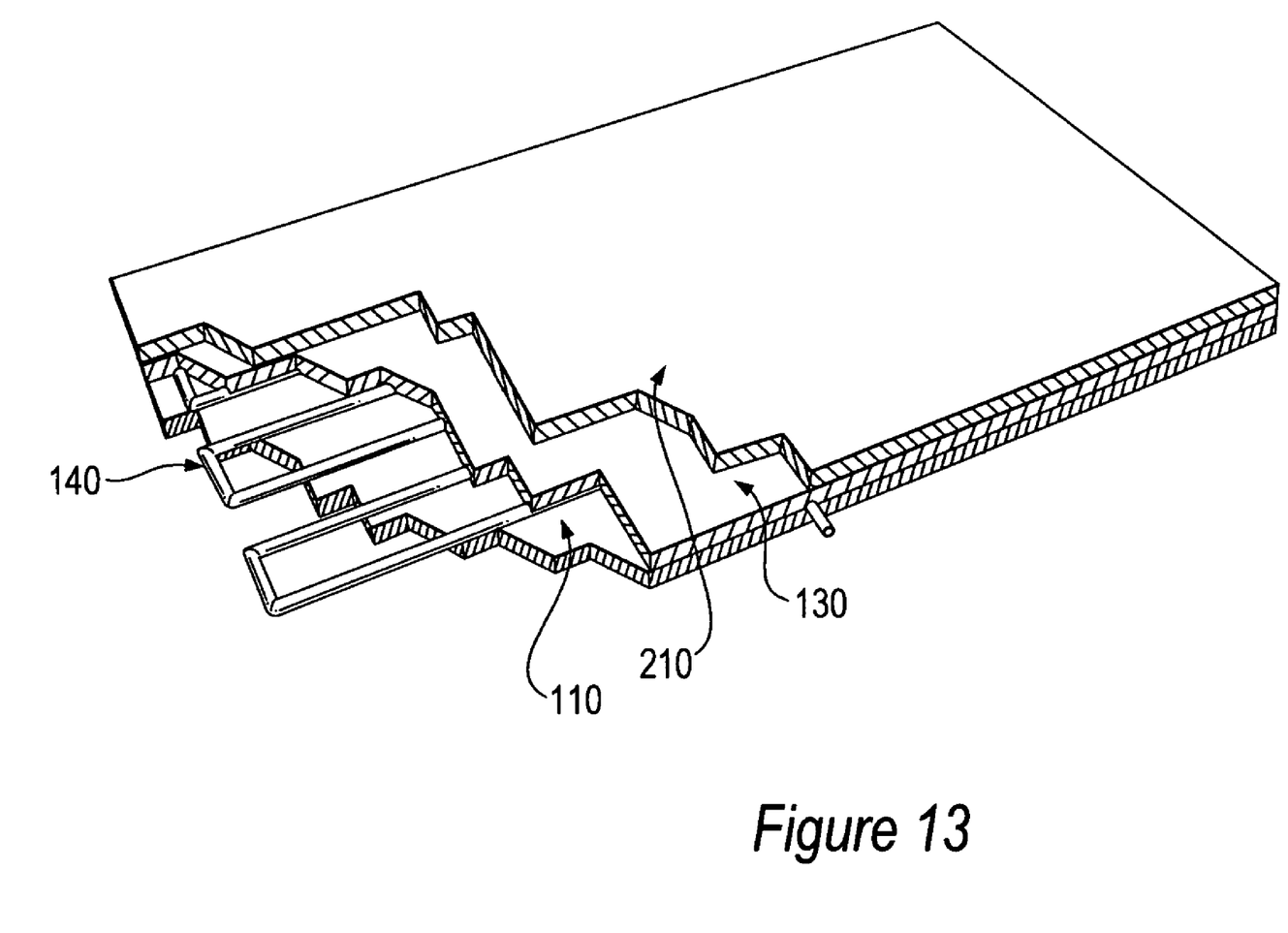
FIG. 13 shows another embodiment of a solar heating apparatus wherein the apparatus is in the form of a panel.

FIG. 13 shows another embodiment of a solar heating apparatus wherein the apparatus is in the form of a panel. In this embodiment the layered panel includes an insulation layer 110 that is adjacent to a heat transfer plate 130. The heat transfer plate 130 is adjacent to the fluid conduit 140. The heat transfer plate 130 is able to conduct thermal energy to the fluid conduit 140, and to the fluid 510 within the fluid conduit 140.

Another embodiment includes a method for heating fluid including pumping a fluid 510 through the fluid conduit 140. The photovoltaic device 1010 is exposed to a radiant heat source (such as, the sun), and conducts heat from the photovoltaic device 1010 to the fluid 510 within the fluid conduit 140, through a heat transfer plate 130. Further, an insulating layer 110 insulates the fluid conduit 140 and heat transfer plate 130. Additionally, the heat transfer plate 130 can be additionally configured to operate as an electrical conductor for the means of making electrical connection to the photovoltaic device.

Additionally or alternatively, the photovoltaic device 1010 can be formed adjacent to the malleable heat transfer layer 210.

Another embodiment further includes an embedded electrical cable 1110 (earlier referred to as the wiring infrastructure 1110) to providing convenient and simple electrical connection to the plurality of photovoltaic devices and having the single output cable 1130. The heat transfer plate 130 can be configured as an electrical conductor for carrying electrical power from the plurality of photovoltaic devices 1010. A more specific embodiment includes the heat transfer plate 130 providing a weather-tight electrical contact point for the electrical connection, 1220 and 1210, of a plurality of photovoltaic devices 1010.

Figure 14:
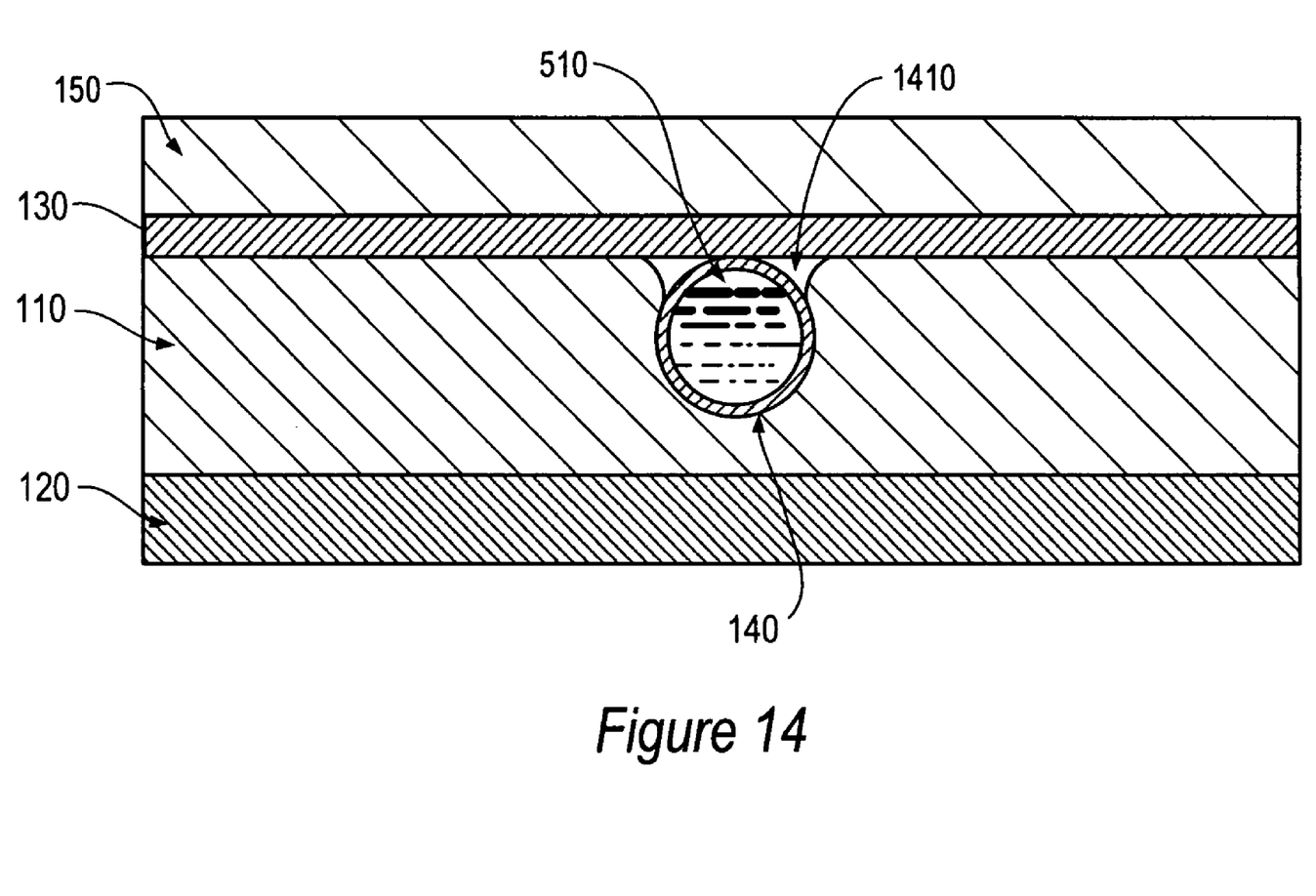
FIG. 14 shows a cross-sectional view of another embodiment of a solar heating apparatus.

FIG. 14 shows a cross-sectional view of another embodiment of a solar heating apparatus. This apparatus comprises an insulation layer 110 adjacent to a fluid conduit 140. The fluid conduit 140 is adjacent to a heat transfer plate 130, and the weather exposed layer 150 is adjacent to the heat transfer plate. The heat transfer plate 130 and the fluid conduit 140 are mechanically and thermally joined by a fillet feature 1410. The fillet feature 1410 increases the conduction heat transfer between the heat transfer plate 130 and the fluid conduit 140 by increasing the area of contact. The fillet feature 1410 can include any material that has good thermal conductivity such as metals, high conductivity glues, plastics or petroleum products and can be fabricated using a variety of methods that include soldering, welding, brazing and gluing. During operation thermal energy collected by the heat transfer plate 130 is conducted through the fillet feature 1410 and fluid conduit 140 into the fluid 510.

Although specific embodiments have been described and illustrated, the embodiments are not to be limited to the specific forms or arrangements of parts so described and illustrated.

What is claimed:

1. A solar heating apparatus of comprising:
  an insulating layer adjacent to an exterior of a structure;
  a heat transfer plate adjacent to the insulating layer;
  a fluid conduit adjacent to the heat transfer plate;
  the heat transfer plate thermally connected to the fluid conduit for transferring heat from the heat transfer plate to fluid within the fluid conduit;
  a weather exposed layer thermally connected to the heat transfer plate through a malleable heat transfer layer, wherein the weather exposed layer comprises a plurality of photovoltaic devices and the heat transfer plate provides an electrical connection between at least two of the plurality of photovoltaic devices.

2. A laminated solar heating panel comprising:
  a heat transfer plate, the heat transfer plate attachable under a weather exposed layer, wherein the weather exposed layer comprises a plurality of photovoltaic devices and the heat transfer plate electrically connects at least two of the plurality of photovoltaic devices;
  a malleable heat transfer layer adjacent to the heat transfer plate, wherein when installed, the malleable heat transfer layer fills gaps between the weather exposed layer and the heat transfer plate and thermally connects the heat transfer plate to the weather exposed layer;
  a fluid conduit in thermal contact with the heat transfer plate, the fluid conduit able to transfer heat from the heat transfer plate to fluid within the fluid conduit; and
  an insulating layer adjacent to the fluid conduit, mountable adjacent to a building structure.

3. The solar heating panel of claim 2, wherein the solar heating apparatus is attached to the building structure by penetrating the solar heating apparatus with fasteners.

4. The solar heating panel of claim 2, wherein the weather exposed layer is attached to the solar heating apparatus by penetrating the weather exposed layer and the solar heating panel with fasteners.

5. The solar heating panel of claim 2, further comprising an embedded electric cable for electrically connecting at least two of the plurality of photovoltaic devices, and providing a single electrical output for the solar heating panel.

6. The solar heating panel of claim 2, wherein the heat transfer plate comprises a highly thermal conductive material that is in thermal contact with the fluid conduit.

7. The solar heating panel of claim 2, wherein the fluid conduit is configured to mate with another fluid conduit of an adjacent solar heating panel when the solar heating panel and the adjacent solar heating panel are attached to the building structure.

8. The solar heating panel of claim 2, further comprising an exterior of the solar heating apparatus being visually marked indicating where not to penetrate the solar heating apparatus.

9. The solar heating apparatus of claim 7, wherein the solar heating panel and the adjacent solar heating panel mate in at least one of a parallel or series connection.

* * * * *